UNITED STATES PATENT OFFICE 2,227,518

HALOPRENE POLYMERS AND PROCESS OF PRODUCING THE SAME

Howard W. Starkweather, New Castle County, and Arnold M. Collins, Wilmington, Del., assignors to E. I. du Pont de Nemours & Company, Wilmington, Del., a corporation of Delaware No Drawing. Original application July 30, 1937, Serial No. 156,518. Divided and this application July 31, 1940, Serial No. 348,678

9 Claims. (Cl. 260—32)

This invention relates to the polymerization of halogen-2-butadienes-1,3. More particularly, it relates to the polymerization of chloro-2-butadiene-1,3 (hereinafter, for convenience, also called "chloroprene"). Still more particularly, it relates to an improved method for polymerizing chloro-2-butadiene-1,3 to a plastic product in the presence of organic modifying agents.

This application is a division of application Serial No. 156,518, filed July 30, 1937.

Carothers and Collins, in their U. S. Patent No. 1,950,432, disclose that, by polymerizing chloro-2-butadiene-1,3 under various conditions, it is possible to obtain products having a variety of degrees of solubility, plasticity, elasticity, and strength. They state that light and pressure and catalysts, such as oxygen and peroxides, influence the polymerization.

Carothers, Collins and Kirby disclose in their U. S. Patent No. 1,950,438 that the character of the product may be modified by carrying out the polymerization in the presence of "inhibitors." Among the "inhibitors" they investigated were various organic sulfur compounds.

U. S. Patent No. 1,967,860, also issued to Carothers, Collins and Kirby, discloses that this polymerization may be carried out in the presence of various solvents.

The emulsification of chloro-2-butadiene-1,3 and its polymerization in that state to obtain a synthetic latex is disclosed in Collins' U. S. Patent No. 1,967,861. Ordinarily, the product obtained by coagulating this emulsion, after polymerization to a synthetic latex, is an elastic, essentially non-plastic cured rubber-like material, but, if the chloro-2-butadiene-1,3 contains 1 per cent of iodine, it polymerizes to a plastic product. Collins also discloses that the addition of diluents or solvents before or after emulsification tends to impart a greater degree of softness and plasticity to the final product. Dales and Downing, in an application filed August 23, 1934, and given Serial No. 741,044, which application was refiled March 2, 1937, and given Serial No. 128,630, which latter application has now matured into U. S. Patent No. 2,138,226, issued November 28, 1938, have described an improved method of emulsion polymerization involving the use of different emulsifying agents.

Williams, in his U. S. Patent No. 1,950,436, discloses that plastic polymers may be produced by partially polymerizing chloro-2-butadiene-1,3 and then separating the unpolymerized material. He describes a method which involves partially polymerizing chloro-2-butadiene-1,3 without the use of solvents, dispersing media, and the like. This method is hereinafter referred to as "massive" polymerization. By suitable compounding and curing, these plastic polymers can be converted into an extremely tough elastic product resembling vulcanized rubber.

It is an object of this invention to provide an improved method for polymerizing compounds of the general formula

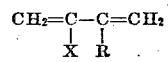

in which X is halogen and R is hydrogen or a hydrocarbon radical. A further object is to provide an improved method for polymerizing halogen-2-butadienes-1,3. A more specific object is to provide a method by which high yields of plastic polymer may be produced from chloro-2-butadiene-1,3 in a single polymerization. A still further object is to produce, in a single polymerization, high yields of a plastic polymer of chloro-2-butadiene-1,3 resembling unvulcanized Hevea rubber in its physical properties and capable of being shaped and cured to form a tough elastic mass closely resembling vulcanized natural rubber. Another object is to provide a process which takes place at a more rapid rate than those previously disclosed for the preparation of plastic polymers. Other objects will appear hereinafter.

The objects are accomplished by polymerizing compounds of the general formula

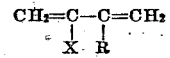

in which X is halogen and R is hydrogen or a hydrocarbon radical, and especially chloro-2-butadiene-1,3 in non-alkaline emulsion in the presence of an organic modifying agent, which, for the purpose of this invention, is defined as an unpolymerizable acid-stable organic compound which is capable of promoting the formation of a plastic polymer from chloro-2-butadiene-1,3 in acid aqueous emulsion even when the polymerization is continued to yields of 50 per cent, which plastic product is capable of being readily cured to a highly elastic product; i. e., these compounds are capable of promoting the polymerization of chloro-2-butadiene-1,3 to plastic polymers continuously during the polymerization, under the conditions specified, but they are distinguished by the fact that they are capable of continuing this effect even when the polymerization is carried on until 50 per cent or more of polymer is formed. It has been found that unpolymerizable acid-stable organic compounds which are capable of forming an addition product with chloro-2-butadiene-1,3 under conditions of polymerization of chloro-2-butadiene-1,3 are suitable. By "conditions of polymerization of chloro-2-butadiene-1,3" is meant just what the expression implies; i. e., under mild conditions of temperature, pressure, time, etc., such as are hereinafter described for the polymerizations of this invention. The preferred halogen butadiene is chloro-2-butadiene-1,3, and preferably also the emulsion is substantially acid during polymerization. The preferred dispersing medium is water.

The essential features of this invention are that an organic modifying agent, as described above, for example, an unpolymerizable acid-stable organic compound which is capable of adding to chloro-2-butadiene-1,3 under mild conditions of reaction to form a definite chemical compound be present during the polymerization of the halogen butadiene, that the polymerization be carried out in emulsion and that the emulsion be acid during at least a part of the polymerization. It has been found that unsaturated compounds containing one or more carbonyl groups adjacent to the double bond are organic modifying agents of this class. By this expression is meant compounds containing the following nucleus

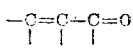

It is, of course, understood that, if a modifying agent is destroyed by the water or other dispersing medium or by the emulsifying agent or, in fact, if the modifying agent reacts to any substantial extent under the conditions of the polymerization with anything present except the halogen diene or its polymers, it is unsuitable for use in emulsion polymerization employing such medium or such agent. Furthermore, if the modifying agents, as defined above, contain free amino or phenolic groups, their use is not, in general, preferred, for the reason that they tend to retard the polymerization to an undesirable extent. Such compounds are, however, included within the scope of this invention and may be valuable in special cases.

To determine that a given compound is capable of acting as a modifying agent, by the test mentioned above, it is only necessary to allow it to stand with an equimolecular proportion of chloroprene under the conditions hereinafter specified for the polymerization of this invention and then to determine whether an addition product has resulted, for example, by separation and analysis of the resulting mass. Thus, alpha-naphthoquinone, which is shown in Example I to be a modifying agent, and chloroprene, warmed together in the proportion of their molecular weights (158 and 88.5), give the corresponding monomolecular addition product, chloro-tetrahydroanthraquinone.

As stated, the polymerizations of this invention are to be carried out in emulsion. The preferred dispersing medium is water, but the invention may be applied to dispersions in other media as well. In fact, any medium can be used in which chloro-2-butadiene-1,3 can be emulsified and which does not prevent its polymerization and which preferably does not even inhibit the polymerization. Thus, glycerol, ethylene glycol, and formamide may be used; provided, of course, that the modifying agent used does not react with them. Emulsions of this type are broadly disclosed in copending applications of Carothers, Serial No. 738,931, filed August 8, 1934, and Dales and Downing, Serial No. 738,929, filed August 8, 1934, which applications have now matured into U. S. Patent Nos. 2,080,558, issued May 18, 1937, and 2,080,561, issued May 18, 1937, respectively.

A third essential feature of this invention is that the emulsion in which the polymerization is carried out be acid during at least the latter part of the polymerization. As mentioned above, it has already been disclosed in U. S. Patent No. 1,967,861 that polymerization in alkaline emulsions in the presence of an inhibitor of polymerization (as defined in U. S. Patent No. 1,950,438), for example, 1 per cent of iodine as in Example 5 of the first patent, gives a high yield of a plastic product. These products, however, although resembling unvulcanized natural rubber in a general way, cannot be so readily converted as the product of the present invention to a form having the high elasticity and strength of vulcanized natural rubber. Furthermore, the use of an alkaline emulsion was indicated, since the emulsifying agents disclosed for example, sodium oleate, give emulsions of sufficient stability only when alkaline.

It has now been found that, when working in acid emulsions made by the use of acid-stable emulsifying agents disclosed in the present application, a much superior plastic product is obtained, provided that the polymerization is carried out in the presence of a small amount of an acid stable modifying agent as defined above.

It has been pointed out above that it is only necessary that the emulsion should be acid during the latter part of the polymerization. Methods of carrying out the present invention in which the emulsion is neutral or very slightly alkaline at the start of the polymerization are thus within the scope of this invention. Such methods are operable for the reason that, as the polymerization proceeds, there is a gradual decrease in the pH of the emulsion so that even though the polymerization be started in a neutral or slightly alkaline emulsion, a substantial portion of it will take place under acid conditions. It is to be understood, however, that the present invention does not include, within its scope, any use of alkaline emulsions other than under the conditions just discussed and that, as a matter of fact, neither the use of slightly alkaline nor the use of neutral emulsions as starting materials is a preferred embodiment.

Under preferred conditions, the emulsion in which the polymerization takes place will be acid throughout its course. The preferred range of acidity is from pH 5 to pH 1. Although many of the modifying agents are themselves acidic, it is often desirable to increase the normal acidity of the emulsion by the addition of another acid such as hydrochloric. It is obvious, of course, that the modifying agents, in order to be operable, must be stable under the acid conditions existing during these polymerizations. The suitable modifying agents have, therefore, been defined as "acid-stable."

The class of halogen dienes to which this invention has been found to be applicable are those which have the above general formula. The definitely preferred member of this group is chloro-2-butadiene-1,3 which, as has been previously disclosed, possesses the ability to polymerize to a rubber-like material which is similar to natural rubber. Although the other halogen dienes included in the class, which have thus far been tested, do not all possess this property to the same degree as chloroprene, they do, nevertheless, polymerize to more or less rubber-like materials and it has been found that, if their polymerization is carried out in the presence of a modifying agent as described above, an improved yield of a more plastic polymer is obtained as contrasted with the product obtained from the same halogen diene in the absence of the modifying agent. Thus, by the present invention, an increased yield of more plastic polymer may be obtained from bromo-2-butadiene-1,3 and also from chloro-2-methyl-3-butadiene-1,3 when they are polymerized in the presence of these organic modifying agents by the method set forth above. Mixtures of two or more halogen butadienes may also be polymerized by the method of this invention.

The organic modifying agent may be brought into contact with the halogen diene in any convenient manner. The reagent may be dissolved or dispersed in either the halogen diene or in the emulsifying medium prior to emulsification or may be added to the emulsion either during or after the emulsification. The modifying agent itself may be added or a salt may be added which, upon the addition of acid, will generate the modifying agent. It is also possible to add only a part of the modifying agent at the start of the polymerization and to add the remainder during its course or, where two different modifying agents are used, one may be added at the start and the other during the course of the polymerization.

In order that the invention may be more fully understood, the following example is given by way of illustration, but the invention is not limited thereto as will be more fully apparent hereinafter.

Example I

One hundred (100) parts, by weight, of chloroprene, substantially free from acetaldehyde, monovinylacetylene, divinylacetylene, methyl vinyl ketone, and dichloro-1,3-butene-2, were treated with 0.2 part of alpha-naphthoquinone and thoroughly emulsified in 400 parts, by weight, of a 2 per cent aqueous solution of cetyl trimethyl ammonium bromide. This emulsification was carried out by repeated passage in a high speed centrifugal pump. The resulting acid emulsion was allowed to polymerize at 20° C. for 48 hours, at the end of which time a density of 1.030 was reached. The synthetic latex thus prepared was treated with 1 part, by weight, of phenyl-beta-naphthylamine dissolved in 9 parts, by weight, of benzene and dispersed in 10 parts, by weight, of the emulsifying solution before adding to the latex. Coagulation was brought about by pouring the latex, with stirring, into an equal volume of ethyl alcohol. The dispersing agent and alcohol were removed from the polymer by washing the coagulum on corrugated, uneven speed-rolls with water at 50° C. until foaming had practically ceased. The product was finally dried by milling on a rubber mill with smooth rolls internally cooled with water so that the temperature of the polymer did not exceed about 40° C. The yield of dry polymer was 75 per cent. The plasticity number of the polymer was 103 (plasticity number, as used herein, is the thickness in thousandths of an inch of a sample 2.5 cc. in volume in the form of a cylinder ⅝ of an inch in diameter which has been heated to 80° C. for 15 minutes and then kept under a weight of 5 kg. for 3 minutes at 80° C.). A cured elastic product was obtained by compounding on a rubber mill, 100 parts, by weight, of the plastic polymer with 5 parts, by weight, of zinc oxide, 10 parts, by weight, of magnesium oxide, and 5 parts, by weight, of rosin and heating the resulting smooth plastic stock for 60 minutes at 131° C. in a vulcanizing press. This product had a tensile strength of 3475 pounds per square inch.

The process of the above example was repeated as described without the addition of the modifying agent (alpha naphthoquinone). The latex reached a density of 1.039 in 18 hours at 20° C. and the polymerization was stopped at this point. The yield was 90 per cent and the plasticity number was 274. The cured product had a tensile strength of 775 pounds per square inch.

The chloroprene used in the example was substantially free from acetaldehyde, monovinylacetylene, divinylacetylene, methyl vinyl ketone, and dichloro-1,3-butene-2. It is possible to obtain satisfactory, although somewhat inferior, results by the use of a less pure chloroprene, particularly if the polymerization is interrupted when the yield is less than with the purer material. Thus, for example, chloroprene containing 0.5 per cent acetaldehyde, 0.3 per cent monovinylacetylene, and 2 per cent dichloro-1,3-butene-2 may be used. Furthermore, by way of additional example, as much as 2 per cent of monovinylacetylene or acetaldehyde or methyl vinyl ketone may be present when the modifying agent is thioglycolic acid without seriously decreasing the quality of the polymer obtained. The amount of divinylacetylene, however, should, preferably, be 0.1 per cent or less. In fact, it is sometimes observed that small amounts of acetaldehyde and monovinylacetylene cause an increase in the tensile strength of the final product. It will be understood, therefore, that this invention is not limited to the use of pure chloro-2-butadiene-1,3 or other halogen-2-butadiene-1,3, although the use of a substantially pure halogen-2-butadiene-1,3 is preferred. Accordingly, the impurities mentioned above or other corresponding ones should not be present in substantial amounts, if the most desirable results are to be obtained, but it should be recognized that the amounts of the various impurities which may be present without seriously decreasing the quality of the polymer will vary somewhat depending on the modifying agent. The halogen butadienes may be polymerized in the presence of other materials, however, to produce useful products as is described herein.

The broad class of modifying agents which may be used in the process of this invention has been defined above. By way of further illustration of the class, it is pointed out that, instead of alpha-naphthoquinone, used in Example I, we may use other unsaturated carbonyl compounds, for example, beta-naphthoquinone, benzoquinone, etc. in which the carbonyl groups are adjacent to the double bond.

Mixtures of two or more organic modifying agents may often be used to advantage as well as mixtures of these with inorganic modifying agents, such as sulfur dioxide and hydrogen sulfide, provided, of course, that the modifying agents selected do not react with each other.

For some purposes, it is desirable to avoid any offensive odor in the final product and, accordingly, a preferred sub-class of modifying agents are those of the broad class above defined which do not themselves have a strong odor under the conditions of the polymerization.

The polymerization in the presence of two or more modifying agents may be varied in the manner generally described both hereinbefore and hereinafter. The use of sulfur dioxide as a modifying agent is disclosed in a copending application of Starkweather, Serial No. 69,739, filed March 19, 1936, which was refiled March 1, 1940, and given Serial No. 321,667, and such use of hydrogen sulfide is disclosed in a copending application of Starkweather and Collins, Serial No. 69,737, filed March 19, 1936, and which has now matured into U. S. Patent No. 2,163,250, issued June 20, 1939. When either of these modifying agents is a component of the mixture of modifying agents, it will be obvious that the methods for introducing them which are disclosed in the above identified copending applications may be used. As already indicated, it has also been found, when employing more than one modifying agent during the polymerization, that it is possible to add the various modifying agents at different times, employing different methods of adding them.

This invention is not limited to the use of any particular emulsifying agent. In general, it may be said that any emulsifying agent or mixture of emulsifying agents may be used which is effective to produce a physically stable emulsion in an acid medium as the medium in which polymerization is to be carried out, and which emulsifying agent does not seriously inhibit the polymerization. For example, those disclosed in the Dales and Downing U. S. Patent No. 2,138,226, above referred to, would be suitable, although, of course, all would not give equally desirable results. Cetyl and octadecyl trimethyl ammonium bromides illustrate a preferred sub-class consisting of soluble salts of quaternary ammonium bases which contain at least one long-chain aliphatic group. In general, substituted ammonium salts containing long-chain aliphatic groups are suitable. Others which may be mentioned include cetyl pyridinium bromide, octadecyl betaine, octadecyl dimethyl ammonium bromide, and diethyl-amino ethyl oleyl amide hydrochloride.

Other types of emulsifying agents which may be used are the soluble salts of the sulphate esters of long-chain aliphatic alcohols (such as the sodium salt of cetyl or octadecyl sulfate), of sulfonated unsaturated hydrocarbons (such as the sodium salt of abietene sulfonic acid), and of alkyl naphthalene sulfonic acids. The soluble salts, particularly the sodium salts of the sulfate esters of straight-chain primary aliphatic alcohols containing from 12 to 18 carbon atoms also constitute a definitely preferred class of emulsifying agents. Mixtures of these ester salts in the proportions in which the acids corresponding to the alcohols occur naturally are frequently used because of their availability. A preferred emulsifying agent of the sulfate ester type is that obtainable by sulfation of oleyl acetate followed by neutralization with sodium hydroxide. Another type of modifying agent is illustrated by the reaction products of a long-chain primary amine with 2 molecules of epichlorhydrine or glycide. When epichlorhydrine is reacted with long-chain primary amines, the products are believed to be alkyl-di(3-chloro-2-hydroxypropyl)-amine. Dispersions of the chloroprene polymer in solutions of the salts of either the sulfate esters, the sulfonates, or the sulfonic acids may be coagulated by the addition of sodium chloride or other water-soluble salt. Dispersions containing the reaction products of long-chain primary amines may be coagulated merely by making alkaline to Brilliant Yellow and heating to 60° C. The coagula are then generally washed with water to remove the salt and dispersing agent, which, if allowed to remain, would, in most instances, increase the difficulty of milling and also tend to decrease the quality of the cured polymer.

The amount such emulsifying agents to be employed will, of course, depend upon the effectiveness of the particular agents. Amounts of emulsifying agent ranging from 0.2 per cent to 2 per cent, based on the water, are employed in the specific emulsions described above. Greater or less amounts of these or other similar agents may be used. The amount necessary is readily determined by experimental trial in any given case. At least, an amount sufficient to prevent separation of a solid or liquid phase should be present, but, if desired, more can be used. According to preferred procedure, amounts of emulsifying agent ranging from 1 per cent to 2 per cent are used. It has been observed that increasing the amount of emulsifying agent, in general, results in increasing the speed of polymerization. The present invention includes within its scope the use of all concentrations and amounts of emulsifying agents which give stable emulsions (i. e., emulsions in which a solid or liquid phase does not separate out) of halogen butadiene in the presence of acid and the organic modifying agents defined above. It is also possible to add more emulsifying agent during the course of the polymerization, if desired, either continuously or in one or more batches. Also, it is often desirable to increase the acidity of the emulsion, containing an organic modifying agent, by addition of acid, such as hydrochloric, for example, in such a quantity that the emulsion will turn Congo red paper to a decided blue color.

The proportion of modifying agent may be varied considerably, the precise amount used depending partly upon the type of modifying agent and emulsifying agent, and partly upon the properties desired in the product. In general, increasing the proportion of modifying agent increases the plasticity of the uncured polymer, but may decrease the tensile strength of the cured polymer. Large amounts of modifying agent also tend to decrease the rate of polymerization.

It is possible to further vary the manner of applying the invention by varying the concentration of the halogen butadiene in the emulsion. There are, of course, certain limits to the concentration of the halogen butadiene which can be dispersed in a given medium. Within these limits, it has been found, moreover, that small amounts of emulsifying solution give thick emulsions which are difficult to maintain at the desired temperature, while large proportions of solutions require inconveniently large reaction vessels and excessive amounts of coagulating agents, although it is possible to use such extreme concentrations. It is to be understood, however, that the invention is not limited to the particular concentrations of chloroprene used in the examples. The preferred range for the concentrations of chloroprene in the emulsions is 20 per cent to 50 per cent, but, as indicated, other concentrations are within the scope of the invention.

The emulsion of the halogen butadiene may be prepared in any feasible manner, such as, by passing the halogen butadiene together with the emulsifying liquid through a gear pump or a centrifugal pump or by turbulent flow or by agitating the materials with a paddle or stirrer or by shaking them in a suitable container. It has been found that the best products are obtained if the chloroprene is emulsified to form very fine particles.

While about 20° C. to 60° C. is the preferred polymerization temperature, it has been found that the polymerization may be effected at temperatures ranging from 0° C. to 100° C. The rate of polymerization is favorably affected by increasing the temperature so that the time of polymerization required to produce similar products will change somewhat with changes in temperature. With temperatures below 20° C., however, the polymerization is sometimes inconveniently slow, while above 50° C. the reaction is usually very rapid, and, therefore, hard to control on a large scale. It has been observed, however, that increasing the temperature of polymerization reduces the tendency of both the cured and the uncured polymer to become stiff and hard when kept for long periods at low temperatures. The rate of polymerization is also favorably affected by increasing the pressure (for a method of employing increased pressures, see an article by Starkweather, J. Am. Chem. Soc. 56, 1870 (1934)), and also by increasing the concentration of the emulsifying agent, as has been pointed out.

The products produced by the process illustrated above will naturally vary considerably in their characteristics, depending upon the particular conditions employed. The extent of polymerization (proportion of chloro-2-butadiene-1,3 consumed) has been found to have a considerable effect upon the properties of the polymer, particularly its plasticity number. The selection of the exact point at which the reaction is stopped depends, however, upon the modifying agent used and the degree of plasticity required for the finished product. In general, and particularly under preferred conditions, it has been found that very good results are obtained if the polymerization is stopped sometime after 75 per cent of polymer has been formed, as estimated as described below.

It has been found that the plasticity number may be accurately controlled by determining the extent of polymerization from time to time and interrupting the polymerization (for example, by adding phenyl-beta-naphthylamine), when the proportion of chlorobutadiene polymerized has reached the value, determined by previous experiment, corresponding to the desired plasticity. The extent of the polymerization may be determined in a number of ways. The amount of polymer formed may be determined directly, for example, by coagulating and drying a sample of the latex, or, conversely, the extent of the polymerization may be determined by measuring the amount of unchanged chlorodiene recovered by any known efficient method (for example, distillation) from the latex or from the serum obtained by coagulation with alcohol. The density of the latex, which is approximately a linear function of the extent of polymerization, may also be used to follow the reaction. An experienced operator can also roughly estimate the extent of polymerization from the consistency of a coagulated sample. In certain cases, it may be desirable to recover the unchanged chlorobutadiene for re-use. This may be done by methods known to the art, such as removal of the chlorobutadiene by distillation from the latex or from the serum resulting from coagulation or by extraction of the coagulum by solvents such as alcohol, followed in each case by suitable purification.

When the polymerization has progressed to the desired stage, an antioxidant such as phenyl-beta-naphthylamine may be added as disclosed above. One per cent of phenyl-beta-naphthylamine, based on the chlorobutadiene, is usually added, but greater or somewhat less amounts are effective. Ethyl-beta-naphthylamine and other similar agents may be used in place of phenyl-beta-naphthylamine, but the latter compound is preferred. It is preferably added in the form of an aqueous emulsion. Frequently it is dissolved in benzene or other suitable solvents before emulsification. The method disclosed in the examples produces very good results, but it will be understood that it may be added in any other convenient way, if desired. It may also be added after coagulation, although not so conveniently.

The polymer may be isolated from the aqueous emulsion by any suitable method, for example, as disclosed above, where the substituted ammonium salts are used as emulsifying agents, by adding ethyl alcohol, as shown in Example I, and where the other emulsifying agents disclosed are used, by adding solid sodium chloride. The polymer may also be obtained from the latex by spray drying or by evaporation of thin films.

Unless the emulsifying agent is completely removed from the polymer in the coagulation step, it may be desirable to remove substantially all of it before the final milling. This is conveniently accomplished by washing with warm water on corrugated rolls or in an internal mixer, by which methods new surfaces of the polymer are being continuously exposed to washing medium. To assist the extraction of the emulsifying agent, alcohol, acetone, or similar solvent which dissolves emulsifying agent, but not the polymer, may be used.

The coagulum, after being washed, if necessary, may be dried, for example, in a current of air at elevated temperatures up to about 100° C. or at sub-atmospheric pressure or by washing with alcohol or may be milled directly, the mechanically generated heat in the latter case assisting the removal of the water. The temperature of the polymer being milled, however, preferably will not exceed about 100° C. and is preferably much less. The rolls of the mill should, therefore, be cooled, for example, with cold water or refrigerating brine.

Volatile material can be removed to any desired extent, by any suitable method, for example, by working the coagulated polymer on a rubber mill, substantially all of it being removed by working to a constant weight. This phase of the process may be practiced in other ways, however.

It is possible to continue the polymerization in emulsion after partial polymerization in the massive form either in the presence or absence of modifying agents. Care must be taken, however, not to allow the polymerization in the massive state, particularly in the absence of modifying agents, to proceed to a point where substantial amounts of the elastic polymer are formed, if maximum yields of plastic polymer are desired. The chloroprene may be dissolved or diluted prior to emulsification, with suitable solvents, such as those described by Carothers, Collins and Kirby in U. S. Patent No. 1,967,860, or the solvents may be added after emulsification.

The further polymerization in emulsion of the partially polymerized halogen butadiene or of the diluted halogen butadiene may be modified in the various particulars described above for the undiluted monomer, for example, the modifying agent may be added either before or after emulsification.

It has been stated above that it is generally desirable to remove substantially all of the emulsifying agent before final milling. This statement is subject to exception where an ammonium salt is used as the emulsifying agent. It has been found that the ammonium salts are capable of exerting a stabilizing effect on the plastic polymers. They intend to prevent them from losing their plasticity. It is, therefore, generally desirable to avoid removing these salts from the polymer, in so far as possible during the coagulation, washing, etc. steps.

It has also been found that halogen-2-butadienes-1,3, specifically chloro-2-butadiene-1,3, may be polymerized in the presence of other materials, such as film-forming materials, for example, polymerizable materials containing two carbon atoms in an open-chain joined by more than one bond, by the methods described above, to produce similar results. A preferred embodiment involves the use of polymerizable materials of the class described, which are miscible with chloroprene.

The polymerization of halogen-2-butadienes-1,3 and particularly of chloro-2-butadiene-1,3 in the presence of other materials is broadly disclosed by Carothers, Collins, and Kirby in U. S. Patent Nos. 2,029,410; 2,066,329; 2,066,330; and 2,066,331; the first of which issued February 4, 1936, and the latter three on January 5, 1937. In general, the process of the present invention is applicable to the polymerizations described in those applications.

When dichloro-2,3-butadiene-1,3 is also present during the polymerization of chloro-2-butadiene-1,3 according to the present invention, especially valuable products are obtained. Polymerization of chloro-2-butadiene-1,3 in the presence of dichloro-2,3-butadiene-1,3 is disclosed in detail by Carothers and Berchet in U. S. Patent No. 1,965,369, issued July 3, 1934, and, as in the case of the Carothers, Collins, and Kirby patents cited above, the present process is applicable generally to the polymerizations disclosed in this Carothers and Berchet patent.

It is possible to carry out the process of the present invention continuously. Thus, the chloroprene may be continuously emulsified by introducing it together with an emulsifying solution into a suitable emulsifier as described above, said emulsifier being of such construction that the chloroprene is thoroughly emulsified during its passage therethrough. The modifying and other agents can also be added with the chloroprene and emulsifying solution so that the emulsion withdrawn from the emulsifier is ready for polymerization. Alternatively, the modifying agent may be added continuously by bringing together a stream of the emulsion and a stream comprising the modifying agent. The various alternative methods described above for bringing together the starting materials for the polymerization step are applicable to the continuous formation of the emulsion to be polymerized.

The presence of an organic modifying agent in the continuous polymerization of chloroprene is also advantageous. Such continuous polymerization may be readily effected by passing a stream comprising the chloroprene, for example, an emulsion of chloroprene containing an organic modifying agent, through a suitable vessel, for example, a tube, maintained at the desired temperature by suitable means, such as a bath, at such a rate that the effluent product from the polymerization vessel has reached the desired stage of polymerization. Continuous polymerization in the presence of the organic modifying agent is quite conveniently effected when the chloroprene is in an emulsified state, and starting with the chloroprene and other ingredients of the emulsion, the plastic polymer may be produced continuously by continuously emulsifying as described above, and then passing the stream of emulsion so prepared for polymerization into the polymerization vessel and therethrough, as described above.

If desired, an antioxidant, such as phenyl-beta-naphthylamine, may be readily incorporated continuously into a stream comprising the polymer, for example, the stream issuing from the continuous polymerization vessel, by admitting into the stream comprising the polymer a stream comprising the antioxidant, the stream of antioxidant being admitted at such a rate that the desired amount of antioxidant is added.

The products of this invention, particularly those obtained from chloroprene, are plastic and readily milled, are soluble in benzene, carbon tetrachloride and similar rubber solvents, and, if they contain suitable antioxidants, they retain their plasticity and milling properties on storage at room temperature for some time. They are readily converted by heat especially in the presence of suitable compounding ingredients at 120° C.–160° C., to strong tough highly elastic products resembling natural rubber in all essential points and having the additional advantage of being much more resistant to the action of organic solvents and chemical reagents generally and of not requiring the use of sulfur and organic accelerators.

Hence, it is obvious that their properties are much the same as the properties of the polymers of chloroprene described by Williams in his U. S. Patent 1,950,436. They may, therefore, be put to the same uses as he mentions for his products as well as to others not mentioned by him specifically, although included by his broad description. For example, they may be dissolved in suitable solvents such as benzene, etc. and used as coating compositions, adhesives for wood, glass, metal, paper, cloth, leather, and the like, or for the impregnation of porous materials. These polymers may also be put to the uses described for the polymers of chloro-2-butadiene-1,3 produced by prior processes in the articles appearing in Ind. Eng. Chem. 25, 1219 (1933), 26 33 (1934); and in Rubber Age for December 10, 1931, at page 213.

To many people, the odor of all these polymers, when cured, with the exception of those in which hydrogen sulfide and the more volatile mercaptans, such as thiophenol and benzyl mercaptan, are used as modifying agents, is less offensive than the odor of vulcanized natural rubber. They have so little odor, in fact, as to be, to many people, substantially odorless.

The products containing the organic modifying agent in chemical combination thus differ chemically from all plastic and readily cured polymers previously described in containing in chemical combination the organic modifying agent used in making them.

The effect of the modifying agents, upon polymerization, is illustrated by comparing Example I with the repetition thereof in which no modifying agent was used. It will be seen that the modifying agents not only lead to the formation of very much more plastic products, but also very greatly increase the tensile strength obtainable on curing.

It has been found that, under preferred conditions of polymerization as set forth above, the modifying agents, which are capable of forming a monomolecular addition product with chloro-2-butadiene-1,3 under mild conditions of reaction, are largely consumed. As set forth in the preceding paragraph, a portion at least of the modifying agent consumed has been found to have gone into chemical combination with the polymer. If, however, the polymerization is stopped when the concentration of polymer formed is low or if the modifying agent or agents is replaced in whole or in part as consumed during the polymerization, then some modifying agent, as such, will remain in admixture with the polymer after the polymerization is stopped. The presence of unconsumed modifying agent in the polymer is not objectionable.

The plastic product produced by the process of the present invention may be compounded and/or moulded and cured to a great variety of elastic products. A wide variety of compounding ingredients and compositions of chloro-2-butadiene-1,3 polymer have been disclosed in the "Duprene Manual" published August 1, 1934, by E. I. du pont de Nemours & Company as well as in U. S. Patent No. 1,950,436 and the Ind. Eng. Chem. articles, cited above. The methods described therein are applicable to polymers produced by the process of this invention. The nature of the compounding ingredients and the proportions in which they are used, of course, vary with the use to which the compounded polymer is to be put. In general, it may be said that the polymers of this invention may be compounded, cured, and used in the manner described for the plastic polymers of chloro-2-butadiene-1,3 produced by previously known methods. Thus, while the use of ZnO, MgO, and rosin has been described above, it is to be understood that carbon black and other compounding ingredients used with previously known plastic polymers of chloro-2-butadiene-1,3 may also be used with those produced by the process of the present invention. It is generally possible also to add some or all of the compounding ingredients, in the form of dispersions in water, to the latex before coagulation. It will be noted, however, that the methods of compounding and curing differ in some respects from those used for natural rubber.

Alternatively, the polymer dispersion or latex obtained as an intermediate in the course of carrying out the present invention may be used as such, with or without the addition of compounding ingredients, but preferably after the addition of antioxidants as described above. In addition, many compounding ingredients may be added to the dispersion prior to polymerization, if desired. The uses of the dispersion are, however, the same as those of natural rubber latex. Thus, for example, it may be used in the preparation of thin-walled articles such as gloves and toy balloons, by dipping a form of suitable shape into the latex, withdrawing, coagulating, and drying the adhering layer, and, if desired, repeating the process, as described by Kirby in U. S. Application No. 572,739, filed November 2, 1931, now matured into U. S. Patent No. 2,076,949, issued April 13, 1937. The articles may then be made elastic by the application of heat. Similarly, latex may be advantageously used for impregnating, coating, or otherwise treating porous or fibrous materials such as paper, cloth, felt, or leather according, in part, to the teachings of Collins and Larson in U. S. Patent No. 1,967,863, followed, if desired, by curing by the application of heat.

The present invention, therefore, provides a method for polymerizing chloro-2-butadiene-1,3 and related compounds by which stable, plastic polymers, free from undesirable by-products and readily convertible to highly elastic, rubber-like materials of high strength, are formed rapidly, in one step, and in high yield. It will further be seen that both the method of polymerization and the products obtained thereby present numerous improvements over previous inventions in this field.

In particular, it should be noted that the results obtained according to the present invention are highly unexpected in the light of the prior art. Thus, many of the organic modifying agents disclosed herein are known in the prior art as inhibitors of polymerization, but, in the process of the present invention, they do not function as inhibitors. To the contrary, it has been found that, in the present process, many of these compounds accelerate the polymerization and that those which do not materially accelerate at least do not have any substantial inhibiting effect.

It is apparent that many widely different embodiments of this invention may be made without departing from the spirit and scope thereof, and, therefore, it is not intended to be limited except as indicated in the appended claims.

We claim:

1. The process which comprises polymerizing a compound of the general formula

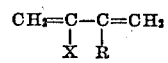

in which X is halogen and R is a member of the group consisting of hydrogen and hydrocarbon radicals, while emulsified and in the presence of an unpolymerizable acid-stable organic compound containing the nucleus

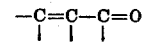

which is capable of forming an addition product with compounds of the above general formula under conditions of polymerization of compounds of the above general formula, said process being further characterized in that the hydrogen ion concentration of the emulsion of the compound of the general formula is on the acid side of pH 7 during the entire period of polymerization.

2. The process of claim 1, further characterized in that the compound of the general formula is chloro-2-butadiene-1,3 and in that the latter compound is emulsified in water.

3. A plastic polymer of a compound of the general formula

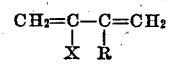

in which X is halogen and R is a member of the group consisting of hydrogen and hydrocarbon radicals, formed by polymerization while emulsified in a liquid, which emulsion is acid during the entire period of polymerization, said plastic polymer being further characterized in that it is capable of being readily cured to a highly elastic product and has in chemical combination with it a small amount of an unpolymerizable acid-stable organic compound containing the nucleus $$-\underset{|}{C}=\underset{|}{C}-\underset{|}{C}=O$$

which is capable of forming an addition product with compounds of the general formula under conditions of polymerization of compounds of the above general formula.

4. The process of claim 1, further characterized in that X in the general formula is chlorine.

5. A product as described in claim 3, further characterized in that X in the general formula is chlorine.

6. The process of claim 1, further characterized in that the compound of the general formula is bromo-2-butadiene-1,3.

7. An elastic polymer of chloro-2-butadiene-1,3 obtained by curing a plastic polymer as described in claim 3.

8. A plastic polymer of chloro-2-butadiene-1,3 formed by polymerization while emulsified in water, which emulsion is acid during the entire period of polymerization, said plastic polymer being further characterized in that it is capable of being readily cured to a highly elastic product and has, in chemical combination, a small amount of an unpolymerizable acid-stable organic compound containing the nucleus $$-\underset{|}{C}=\underset{|}{C}-\underset{|}{C}=O$$

9. An elastic polymer obtained by curing a plastic polymer of claim 8.

HOWARD W. STARKWEATHER.
ARNOLD M. COLLINS.